April 28, 1936.  F. E. STAATS  2,038,613
HYDRAULIC CLUTCH AND BRAKE
Filed April 25, 1934  3 Sheets-Sheet 1
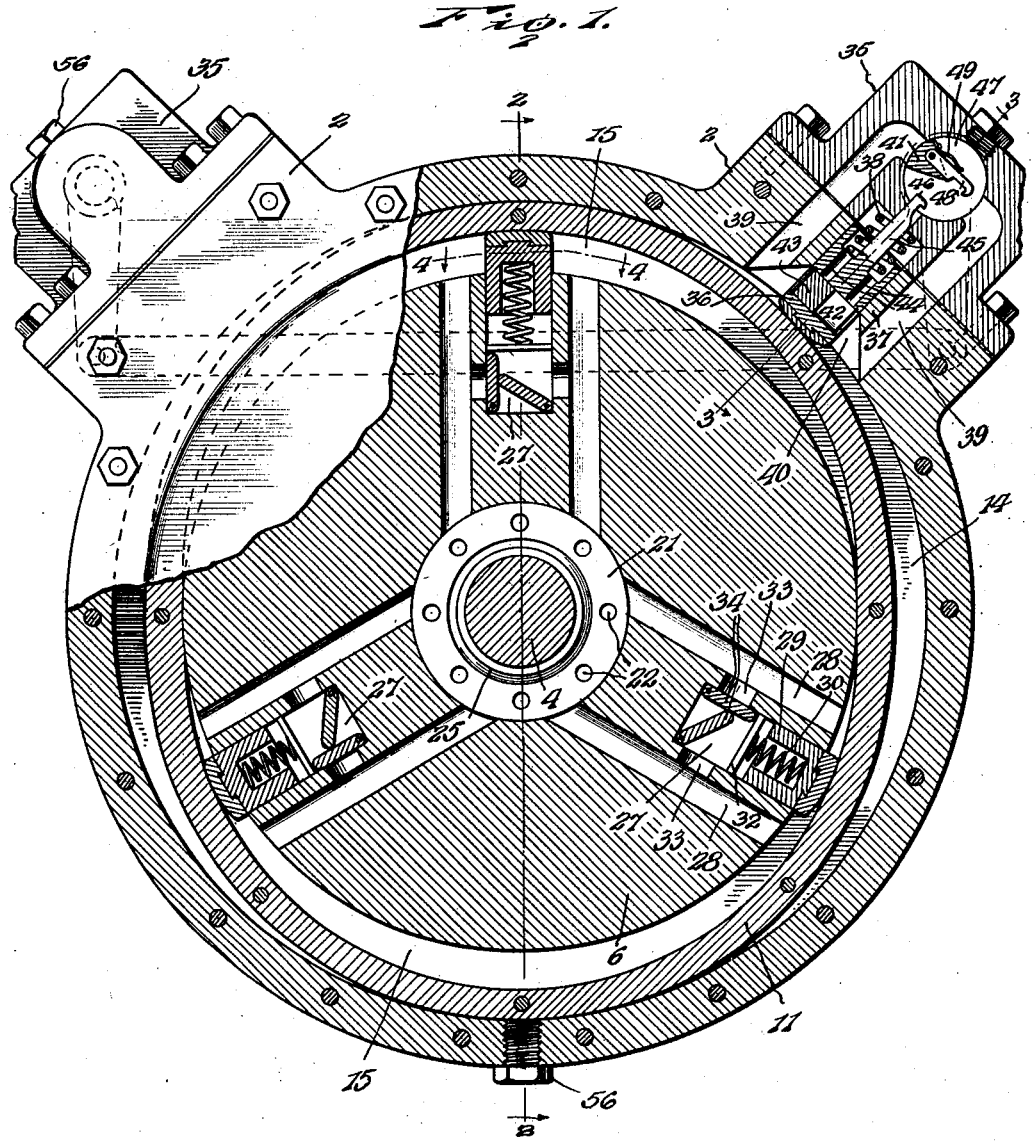
Inventor
F. E. Staats.
By Lacey & Lacey, Attorneys

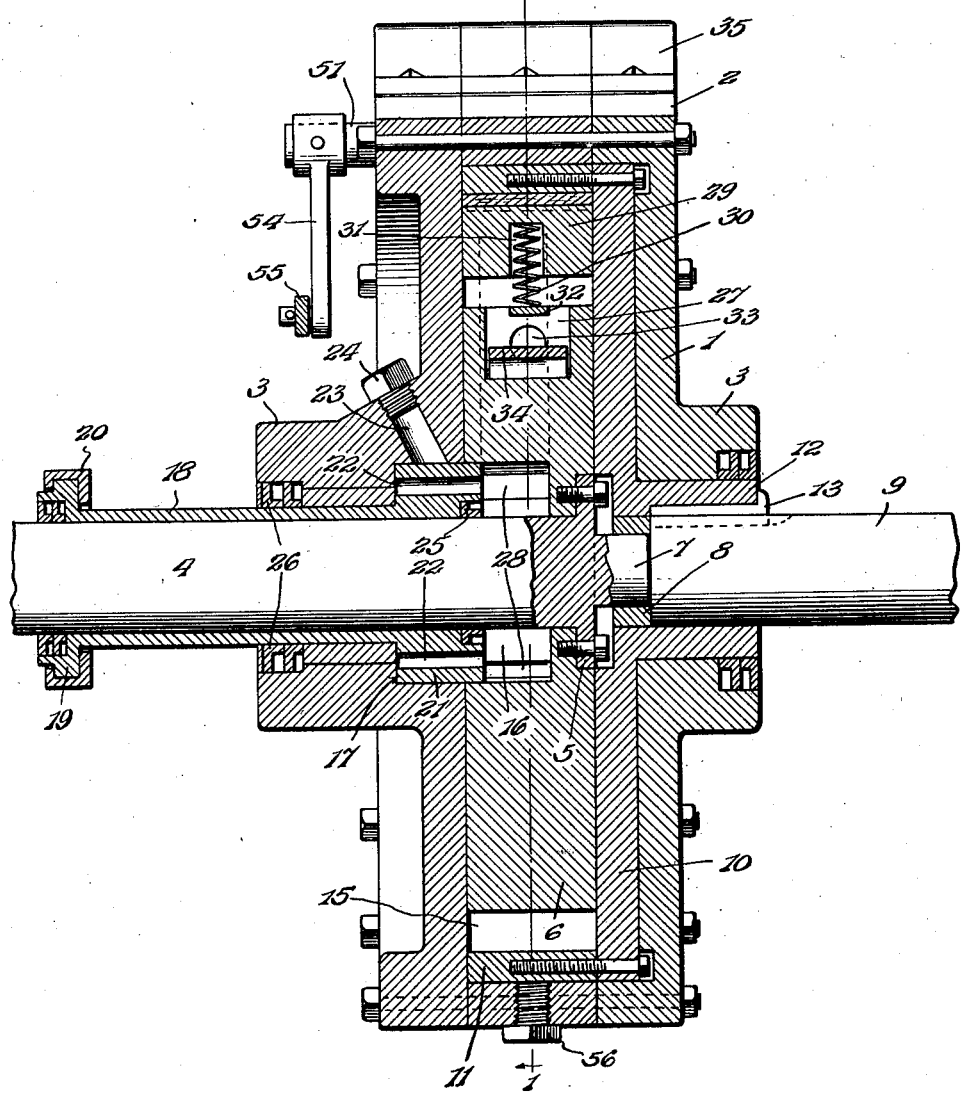

April 28, 1936.   F. E. STAATS   2,038,613
HYDRAULIC CLUTCH AND BRAKE
Filed April 25, 1934   3 Sheets-Sheet 3
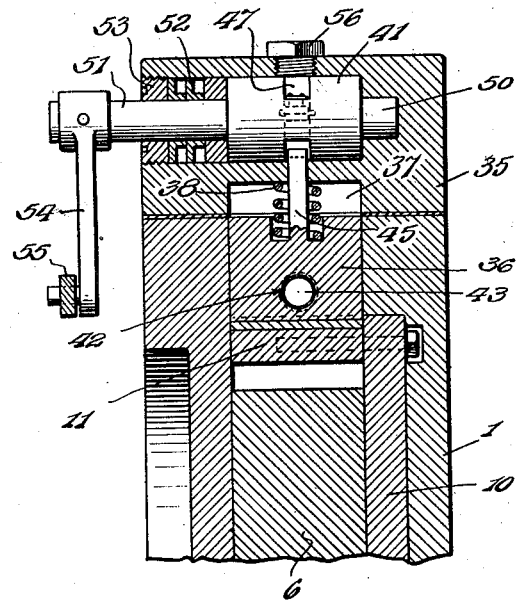
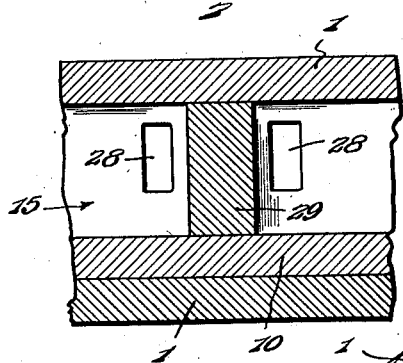
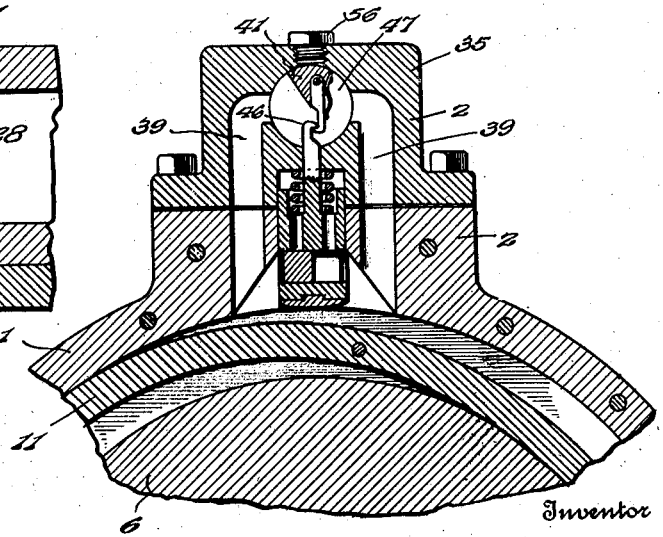
Inventor
F. E. Staats.
By Lacey & Lacey, Attorneys Patented Apr. 28, 1936

2,038,613

UNITED STATES PATENT OFFICE 2,038,613

HYDRAULIC CLUTCH AND BRAKE

Franklin E. Staats, Peoria, Ill., assignor to Staats Hydraulic Appliance, Inc., Peoria, Ill., a corporation of Illinois Application April 25, 1934, Serial No. 722,379

6 Claims. (Cl. 192—12)

This invention relates to hydraulic brakes and clutches and the object of the invention is to provide an improved mechanism whereby the ability of a liquid to resist compression will be utilized to transmit motion from a driver to a driven element. The invention provides novel means for filling the apparatus with the liquid and also provides novel means for controlling the operation. The invention is illustrated in the accompanying drawings and consists in certain novel features which will be particularly pointed out in the claims following a detailed description.

In the drawings.

Figure 1 is a vertical section taken transversely to the driving and driven shafts through an apparatus embodying the present invention.

Figure 2 is a longitudinal section on the line 2—2 of Figure 1.

Figure 3 is an enlarged detail section on the line 3—3 of Figure 1.

Figure 4 is a detail view, partly in plan and partly in section, on the line 4—4 of Figure 1.

Figure 5 is a detail section of the brake element showing the same in a position different from that shown in Figure 1.

In carrying out the present invention, there is provided a casing 1 which is cylindrical in form and provided with spaced offsets 2 in which the brake elements are mounted. This casing 1 may be secured in fixed position in any convenient or preferred manner and its side plates are each provided with bosses 3 within which the respective shafts are journaled. The driving shaft 4 may be connected to any preferred form of engine or prime motor and extends through the side of the casing into the central chamber thereof where it is formed with an annular flange 5 which is bolted to the rotor 6. The inner end of the driving shaft is also formed with a central stud 7 which fits within a bearing ring 8 disposed between the driving shaft and the driven shaft 9. The rotor 6 fits closely but rotatably within a chamber defined by a side plate 10 and a flange or ring 11 which is formed integral with or rigidly secured to the side plate 10, as shown in Figure 2. This side plate 10 has a central hub 12 which is rotatably mounted within the adjacent boss 3 and is keyed to the driven shaft 9, as shown at 13. The ring or flange 11 is flattened at portions of its surface so that it is eccentric to both the rotor and the casing, as clearly shown in Figure 1, whereby cam chambers 14 are defined by the ring and the casing, and similar cam chambers 15 are defined between the rotor and the flange. The rotor is provided with a central chamber 16 which is circular in cross section and registers with a similar chamber in the adjacent side plate of the casing, indicated at 17. A control sleeve 18 is fitted around and slidably mounted upon the driving shaft 4 and is equipped at its outer end with an annular head or rib 19 fitting within a ring 20. The inner end of the sleeve is formed with a head 21 which fits closely within the chamber 17 and is adapted to slide into the central chamber 16 of the rotor when the sleeve is pushed inwardly.

The head 21 is provided with a plurality of longitudinal openings 22 therethrough which will accommodate a flow of oil or other non-compressible fluid. A filling opening 23 is provided in the side wall of the casing and leads into the chamber 17, as clearly shown in Figure 2, a plug 24 being normally engaged in the outer end of the opening, as shown. A sealing ring 25 is fitted in the inner end of the sleeve 18 about the shaft 4 and similar rings 26 are fitted about the sleeve within the hub or boss 3 at the outer end of the boss.

Cylinders or chambers 27 are formed radially in the rotor and, parallel with the sides of the respective cylinders, passages 28 are provided, said passages opening at their inner ends into the chamber 16 and at their outer ends into the cam chamber 15 with which they happen, at the time, to register, the inner ends of said passages 28 being covered or closed when the head 21 is pushed inwardly to the limit of its movement. Slidably fitted in the outer portion of each cylinder 27 is a plunger 29 which is projected outwardly by an expansion spring 30 seated within a central recess or chamber 31 provided therefor in the plunger and having its outer end bearing against the outer end of said recess or socket and its inner end bearing upon a small plate or abutment 32 which is disposed on a diameter of the cylinder intermediate the ends of the same. Ports 33 are provided in the sides of the cylinder 27 to establish communication between the cylinder and the respectively adjacent passages 28 and in the inner end of the cylinder are mounted check valves 34 which are adapted to close the respective ports 33, as will be understood upon reference to Figure 1. It will be noted that these valves are pivoted at the extreme inner end of the cylinder in the corners of the same and are of such dimensions that they will extend from their pivots to the abutment 32 and either valve will be closed accordingly as the rotor is moving in one or the opposite direction. The valve which is open will rest against the inner face of the valve which is closed and if the pressure should be reversed so that the closed valve will tend to open under the pressure, the open valve will yield to the movement and will ride on the inner face of the closed valve toward the free end of the same and, consequently, will assume closed position as the closed valve opens.

When it is desired to fill the chambers in and around the rotor, the plug 24 is withdrawn and the sleeve 18 is pushed partly inward so that the head 21 will clear the inner end of the port or opening 23, while the inner ends of the passages 28 will be partly, but not completely, covered. The liquid is then poured into the filling opening and will accumulate within the chamber 17 and flow therefrom through the openings 22 into the chamber 16 whence it will enter the passages 28 and thereby reach the cam chambers defined by the rotor and the flange or ring 11. When the rotor is initially set in motion, the liquid, which may be in the cam chambers 15, will be caused to circulate by and around the respective plungers 29 in an obvious manner, it being noted that the plungers are normally projected by the springs 30 but will yield to the eccentricity of the flange 11 as the rotor rotates. Some of the liquid will pass through a port 33 into the cylinder housing the plunger and will exert pressure upon the plunger supplementing the spring to hold the plunger in projected position. The liquid, however, will bypass the plunger inasmuch as it will flow inwardly through one of the passages 28 to the chamber 16 and then out through the adjacent passage 28 to re-enter the cam chamber. If, however, the sleeve 18 be pushed inwardly to the limit of its movement, the head 21 will entirely cover the inner ends of the passages 28 and thereby cut off the circulation or flow of the liquid whereupon the plungers will be locked in their projected positions and will be unable to yield to the eccentricity of the flange 11. Consequently, the flange will be caused to rotate with the rotor. The flange 11 being fixed to the side plate 10, the side plate will, of course, rotate with the flange and inasmuch as the side plate is keyed to the driven shaft 9, said shaft will be rotated to actuate the machine or element which is to be driven.

The bosses or offsets 2 have covers or caps 35 secured thereon and within each offset or boss, and the corresponding cap is mounted a plunger 36 which constitutes a brake element, said plunger being slidably mounted in a cylinder 37, formed in the offset and the cap, and normally pressed inwardly to bear upon the outer surface of the ring 11 by an expansion spring 38 seated, at one end, in the outer end of the plunger and having its opposite end bearing against an end wall of the cylinder 37. Passages 39 are formed in the bosses and the caps, at the sides of the respective cylinder, and the inner ends of these passages open directly into a flared chamber 40 in the inner circumference of the casing 1, as clearly shown in Figure 1. The outer ends of the passages 39 open into a valve chamber in the cap in which is mounted a rotary valve 41. Near its inner end, the plunger 36 is provided with a diametric passage or port 42 within which is slidably fitted a disk valve 43 which is slidable from end to end of the port or passage and may close either end according to the direction in which the liquid is flowing. At the outer side of the port or passage 42, ports 44 are formed in the plunger to permit liquid to pass from the port 42 to the outer end of the cylinder 37 and bear upon the plunger so as to maintain it projected to bear upon the ring 11. A stem 45 extends outwardly from the plunger axially through the spring 38 and the outer extremity of this stem is formed into a hook or latch 46. The valve 41 is a bar or rod circular in cross section to fit closely, but rotatably, within the seats provided therefor in the cap 35 and between its ends is formed with a groove 47 extending part way around the circumference of the valve. Between the ends of this groove, a latch 48 is pivotally fitted in the body of the valve and is held against its seat by a spring 49, the free end of this latch being formed into a hook adapted to mate with and engage under the bill of the hook 46 so that, when the two latches are engaged, the plunger will be held in its retracted position and the brake will be off. It will be understood that the flange 11 acts as a cam upon the several brake plungers so that as the high part of the cam rides under the plungers, the plungers will be projected outwardly and if the latch 48 be then in the position shown in Figure 5, the two latches will engage and the plunger will be held free of the flange so that the rotation of the elements will be unimpeded. The valve is provided at one end with a trunnion or stud 50 rotatably seating in a socket provided therefor in the side wall of the cap 35 and at its opposite end is provided with an extended trunnion or shaft 51 which extends beyond the adjacent side of the cap, as clearly shown in Figure 3, sealing rings 52 and a retaining plug 53 being fitted in the side wall of the cap around said shaft, as clearly shown. A crank arm 54 is secured upon the free end of the shaft 51 and to the outer end of said crank arm is pivotally attached one end of a link 55 which extends across to and at its opposite end is pivoted upon the corresponding end of a similar crank which operates another valve corresponding in all respects to that which has just been described. It will be understood that the number of cam chambers may be greater or less according to the demands of any particular circumstances and that a greater or less number of brake plungers may be provided, as desired. The number of plungers in the rotor may be varied also according to the size of the apparatus in which the invention is embodied or other controlling circumstances. The cranks 54 and link 55 provide for simultaneous operation of all the controlling valves and either crank or the link may be connected with a hand lever or a pedal, or other instrumentality, by which the valves may be set, as desired.

At the lowest point of the casing and in the center of the top of each cap 35, there are provided openings receiving plugs, such as indicated at 56. These openings are provided to facilitate filling of the passages around the brake plungers and the cam chambers in which brake plungers operate. One of the openings may be utilized as a vent to permit escape of air which would be otherwise trapped within the apparatus and interfere with the proper circulation of the liquid. Of course, after all the passages and chambers have been filled with the liquid, the plugs are inserted so that all the openings will be closed and loss of the liquid will thereby be prevented. The port or filling opening 23 is of sufficient diameter to permit escape of any air which would be otherwise trapped in the rotor without necessitating the provision of special vent openings.

It will be understood that when the brake plungers are in active position, as shown in Figure 1, the liquid will be forced into the cylinders, at the rear of the plungers, and will hold them in the flange-engaging position so that the brake will be set and rotation of the driven shaft will be prevented, and that the valve blocks one of the passages 39 so that circulation of the liquid is arrested. When said plungers are in the position shown in Figure 5, the liquid may by-pass around the plungers through the passages 39 and the groove 47 and will thereby avoid releasing the plungers and setting the brakes. If it be desired to permit the engine to idle, the sleeve 18 is drawn outwardly either wholly or partly and a circulation of the oil will then be permitted whereby the several gripping plungers will be bypassed and may move inwardly against the tension of the springs 30 as they ride on the low parts of the inner cam surface of the flange 11.

From the foregoing description, taken in connection with the accompanying drawings, it will be seen that I have provided a very simple and compact mechanism whereby the brakes and the driving power will be utilized upon a common element so that an operating mechanism may be permitted to operate or be quickly stopped and just as quickly again set in motion without the provision of complicated gearing and without any jarring action or grinding noise when working.

Having thus described the invention, I claim:

1. A combined brake and clutch comprising a stationary casing, a rotor mounted in the casing, a ring disposed within the casing and between the same and the rotor and eccentric to both the rotor and the casing, and means acting upon the inner and outer peripheral faces of the ring whereby the ring may be locked to the rotor to rotate therewith in either direction of rotation or may be held against rotation while the rotor in either direction may rotate.

2. A mechanism of the type described comprising a stationary casing, a rotor mounted in the casing, a ring mounted between the rotor and the casing and eccentric to both the rotor and the casing, plungers mounted in the rotor to bear upon the inner surface of the ring, brake plungers mounted in the casing to bear upon the outer surface of the ring, passages being provided for conducting liquid to and about the plungers, and means for controlling flow of liquid through the passages whereby the liquid may be caused to selectively apply pressure to the plungers or be by-passed around the plungers and the ring thereby held against rotation or caused to rotate with the rotor.

3. A mechanism of the type described comprising a stationary casing, a rotor mounted therein, a ring disposed between the rotor and the casing and eccentric to both the rotor and the casing, plungers mounted in the casing and in the rotor and adapted to engage opposite sides of the ring, passages being provided for conducting liquid to and about the plungers, and means for controlling flow of liquid through the passages whereby the liquid may be caused to selectively apply pressure to the plungers or be by-passed around the plungers and the ring thereby held against rotation or caused to rotate with the rotor.

4. In a mechanism of the type described, a stationary casing, a rotor, an intermediate member to be driven by the rotor and eccentric to both the rotor and the casing, plungers carried by the rotor, the rotor having passages parallel with diameters thereof at opposite sides of the respective plungers, a filling passage and a central chamber into which said passages open, plungers in the casing, a driving shaft secured to the rotor, a sleeve slidably mounted upon said shaft and having a head at its inner end adapted to cover or uncover the inner ends of the parallel passages in the rotor whereby liquid may be bypassed around the plungers or locked against circulation to hold the plungers in projected position, and means in the casing to direct liquid to or bypass it around the plungers therein.

5. In mechanism of the type described, a casing, a rotor, a driven member disposed between the casing and the rotor, means whereby said member may be locked to the rotor, brake plungers mounted in the casing to bear upon the outer surface of the driven member, means for circulating a liquid about the brake plungers or directing the liquid to bear upon said plungers, latches carried by the plungers and projecting outwardly therefrom, valves mounted adjacent the plungers, and latches carried by the valves to engage the latches on the plungers and hold them retracted.

6. In mechanism of the type described, a casing, a rotor therein, a driven member between the rotor and the casing, means for hydraulically coupling the rotor to the driven member, brake plungers mounted in the casing to bear upon the driven member and resist movement thereof, passages in the casing for the circulation of liquid to and around the plungers, valves in said passages to direct the liquid against the plungers or bypass it around the plungers, and latches on the valves to retain the plungers in retracted position when the valve is in bypassing position.

FRANKLIN E. STAATS.